(12) United States Patent
Klemm et al.

(10) Patent No.: US 8,310,199 B2
(45) Date of Patent: Nov. 13, 2012

(54) ELECTRONIC CIRCUIT FOR A SMALL ELECTRIC APPLIANCE

(75) Inventors: Torsten Klemm, Badd Soden (DE); Joachim Lepper, Usingen (DE); Matthias Schiebahn, Bad Camberg (DE)

(73) Assignee: Braun GmbH, Kronberg (DE)

( * ) Notice: Subject to any disclaimer, the term of this patent is extended or adjusted under 35 U.S.C. 154(b) by 764 days.

(21) Appl. No.: 12/097,472

(22) PCT Filed: Dec. 1, 2006

(86) PCT No.: PCT/EP2006/011575
§ 371 (c)(1),
(2), (4) Date: Nov. 18, 2008

(87) PCT Pub. No.: WO2007/068364
PCT Pub. Date: Jun. 21, 2007

(65) Prior Publication Data
US 2009/0179614 A1  Jul. 16, 2009

(30) Foreign Application Priority Data
Dec. 14, 2005  (DE) .......... 10 2005 059 571

(51) Int. Cl.
*H02J 7/00* (2006.01)
*H02K 7/14* (2006.01)

(52) U.S. Cl. ........ 320/108; 320/114; 320/115; 320/136; 310/50

(58) Field of Classification Search .................. 320/108, 320/114, 115, 136; 310/50
See application file for complete search history.

(56) References Cited

U.S. PATENT DOCUMENTS

| | | | | |
|---|---|---|---|---|
| 4,412,168 A * | 10/1983 | Sell | ............................... | 320/136 |
| 4,504,775 A * | 3/1985 | Becker | .......................... | 320/140 |
| 5,371,454 A * | 12/1994 | Marek | ........................... | 320/108 |
| 5,587,645 A * | 12/1996 | Sciammarella et al. | ...... | 362/253 |
| 6,028,413 A * | 2/2000 | Brockmann | ................... | 320/108 |
| 6,917,182 B2 * | 7/2005 | Burton et al. | ................ | 320/108 |
| 7,932,694 B2 * | 4/2011 | Watanabe et al. | ............. | 320/113 |
| 8,030,887 B2 * | 10/2011 | Jung | ............................... | 320/108 |
| 2002/0089305 A1* | 7/2002 | Park et al. | ..................... | 320/108 |
| 2008/0197804 A1* | 8/2008 | Onishi et al. | .................. | 320/108 |
| 2009/0001932 A1* | 1/2009 | Kamijo et al. | ................ | 320/108 |
| 2009/0174364 A1* | 7/2009 | Onishi et al. | .................. | 320/108 |

FOREIGN PATENT DOCUMENTS
DE  100 16 520  10/2001
(Continued)

*Primary Examiner* — Drew A Dunn
*Assistant Examiner* — Steve T Chung
(74) *Attorney, Agent, or Firm* — David K Mattheis; Kim W Zerby

(57) ABSTRACT

An electronic circuit for an electric appliance. In one embodiment, there is provided an electronic circuit for a battery-operated electric appliance, which can be inductively fed by an external electric power source, comprising a charging circuit for charging an accumulator (A), which encompasses a charging coil (L2) and a diode (D2), wherein the accumulator (A) is connected in series to the diode (D2) and the charging coil (L2), a light emitting diode (LED) as display for the charging process and/or charging status of the accumulator (A), wherein an end of the charging coil (L2) is connected to the cathode of the diode (D2) and the anode of the light emitting diode (LED) and the negative pole of the accumulator (A) is connected to the anode of the diode (D2).

13 Claims, 3 Drawing Sheets

FOREIGN PATENT DOCUMENTS

| | | |
|---|---|---|
| DE | 696 17 026 | 6/2002 |
| DE | 101 56 939 | 6/2003 |
| EP | 0 903 830 | 3/1999 |
| JP | 04-317527 A | 11/1992 |
| JP | 06-054455 A | 2/1994 |
| JP | 06-303702 A | 10/1994 |
| JP | 2002-209344 | 7/2002 |
| WO | WO02/19489 | 3/2002 |

* cited by examiner

ELECTRONIC CIRCUIT FOR A SMALL ELECTRIC APPLIANCE

CROSS REFERENCE TO RELATED APPLICATIONS

This application is the national stage of International Application No. PCT/EP2006/011575 filed Dec. 1, 2006, which claims priority under 35 U.S.C. §119(a) to German Application No. 102005059571.5, filed Dec. 14, 2005, the entire contents of which are hereby incorporated by reference.

TECHNICAL FIELD

The disclosure relates to an electronic circuit for a battery-operated electric appliance.

BACKGROUND

A battery-operated device having an electronic circuit and an accumulator can be charged by a charger. If the voltage supplied by the charger breaks down in response to a discharged accumulator, the electronic circuit may not be operational any longer.

SUMMARY

A sufficiently high voltage is fed to an electronic circuit during the charging process of the accumulator from a capacitor, which is charged by the charger via a diode. The capacitor is charged via an electronic switch that continuously interrupts the charging process of the accumulator for short periods of time, during which the charger is unloaded and the voltage thereof increases to the extent that the capacitor is charged via the diode. The capacitor may feed the electronic circuit during the charging process of the accumulator. The capacitor may be dimensioned in such a manner that its voltage during its discharge drops only to a tolerable extent.

In one example, the electronic circuit can be employed with a battery-operated electric appliance, for example an electric toothbrush or an electric razor, which employs two different operating states, namely a first state in which the small electric appliance is handled by a user, and a second state, in which the small electric appliance is inductively connected to a charging station. A display can signalize the charging process during the charging of the accumulator and/or the charging status of the accumulator after the charging is completed.

The electric appliance may also include a light emitting diode as display for the charging process and/or the charging status of the accumulator. The forward voltage of the light emitting diode may be greater than the battery voltage. The charging process and/or the charging status, for example, can thus be indicated by a blue light emitting diode, even though the small electric appliance is operated by means of an accumulator, which only encompasses one cell. Furthermore, the electric circuit may be configured in such a manner that the light emitting diode is not subjected to a voltage in reverse-biasing.

The electronic circuit can also have a series connection, which includes the accumulator, a rectifier diode and a charging coil. When the charging coil is coupled to a charger, the charging coil can supply an alternating current, which is rectified by the rectifier diode and which charges the accumulator. Depending on the polarity of the accumulator and/or the type of electronic component used (for example npn transistors instead of pnp transistors), respectively, the end of the charging coil may be either connected to the anode of the rectifier diode and the cathode of the light emitting diode or to the cathode of the rectifier diode and the anode of the light emitting diode. The electronic circuit can also include a control circuit for controlling the light emitting diode and the charging process of the accumulator and/or a load, which, in the case of an electric toothbrush or an electric razor, consists of an electric motor, for example. The accumulator may feed current to the control circuit. The charging of the accumulator is possible even with a deep-discharged accumulator, such as when the control circuit is not operational. When the battery voltage is sufficiently high, the control circuit is operational and, if applicable, completes the charging of the accumulator. For example, it may control a controllable switch, which effectively short-circuits the alternating current supplied by the charging coil, that is, the charging current can then no longer flow into the accumulator, but only through the controllable switch, the rectifier diode and, if applicable, the light emitting diode. The light emitting diode can be turned on and off by the control circuit via a further controllable switch. For example, the charging process may be turned off by-criteria, such as, for example, battery voltage, charging and/or discharging time, charging and/or discharging current and/or battery temperature, etc.

BRIEF DESCRIPTION OF THE DRAWINGS

Exemplary embodiments of electronic circuits are illustrated in the drawings, in which the same components are provided with the same reference numerals. Further embodiments are described in the detailed description section.

DETAILED DESCRIPTION

Figure 1:
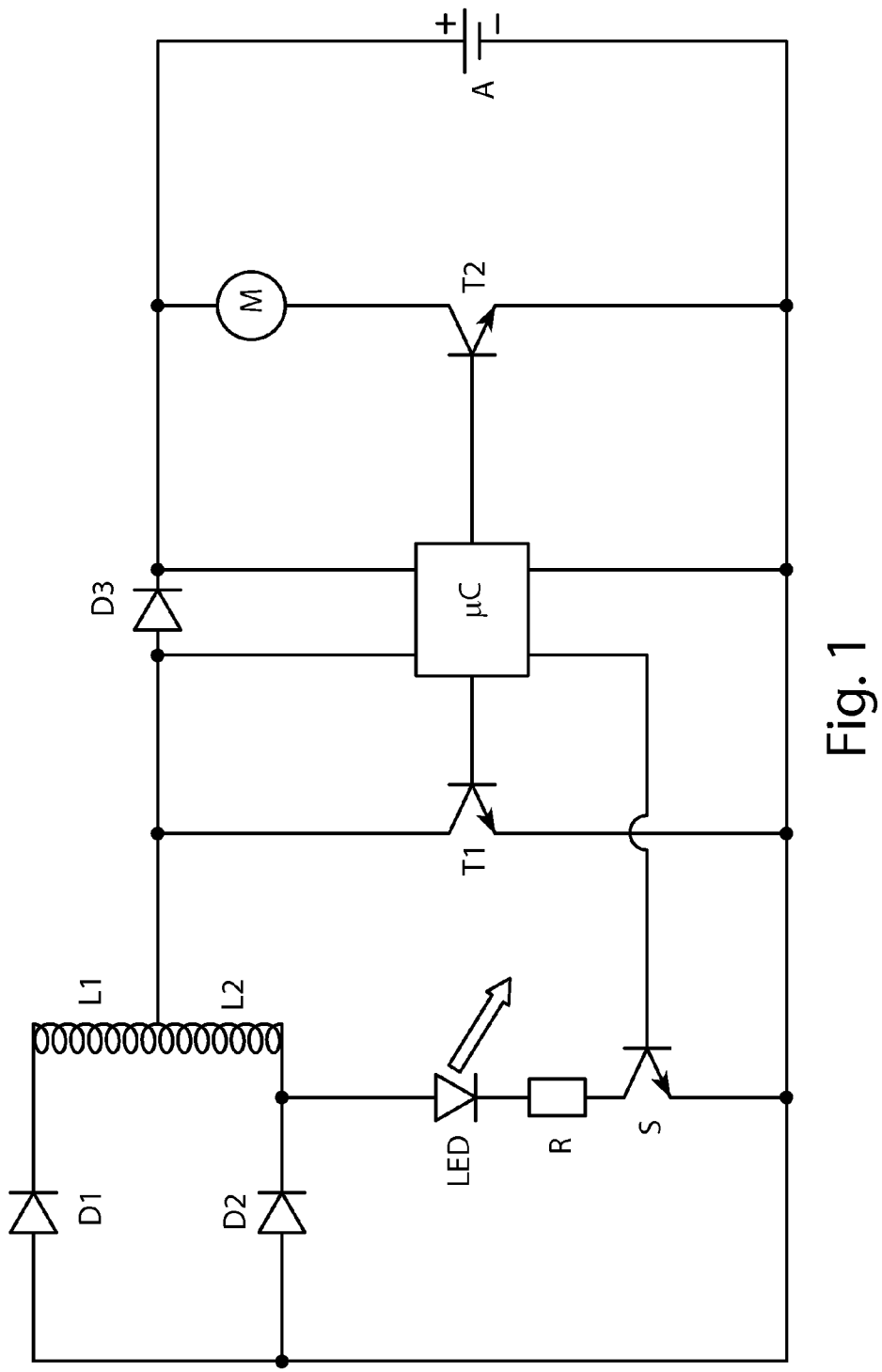
FIG. 1 shows a first electronic circuit.

The first electronic circuit illustrated in FIG. 1 comprises a full-wave rectifier, which encompasses a first diode D1, a second diode D2 and a charging coil, which includes a central tap, a first partial winding L1, and a second partial winding L2. The central tap of the charging coil is connected to the anode of a further diode D3, the cathode of which may be connected to the positive pole of an accumulator A. The negative pole of the accumulator A is connected to the anodes of the first D1 and second diode D2 and is connected to the central tap of the charging coil via a first transistor T1. The cathode of the first diode D1 is connected to the first partial winding L1 and the cathode of the second diode D2 is connected to the second partial winding L2 and to the anode of a light emitting diode LED. The cathode of the light emitting diode LED is connected to the negative pole of the accumulator A via a resistor R and a controllable switch S, for example a transistor. A series connection including of an electric motor M and a second transistor T2 is connected to the accumulator A. Another load can also be connected to the accumulator A via an electronic switch. The controllable switch S and the first T1 and second transistor T2 are controlled by a control circuit uC, to which current is fed by the accumulator A. The control circuit uC is furthermore connected to the central tap of the charging coil, so as to detect the absence/presence of a charging voltage.

One mode of operation of this electronic circuit will be defined below. When the charging coil is inductively coupled with a charger, which is not illustrated in FIG. 1, the full-wave rectifier supplies a pulsating direct current at its central tap and a corresponding pulsating direct current flows across the further diode D3 into the accumulator A, which is thereby charged. If the accumulator A was deep-discharged at the onset of the charging, the voltage at the accumulator may be so small that the control circuit uC is not operational. When, after a brief charging, the battery voltage increases to the extent that the control circuit uC "wakes up", the control circuit uC detects the presence of the pulsating direct current and turns on the light emitting diode LED via the controllable switch S. The light emitting diode LED optically displays the charging state of the accumulator A. Furthermore, the control circuit uC may continuously compare the size of the battery voltage to a reference value, which corresponds to the voltage of a fully charged accumulator. If the control circuit uC recognizes that the accumulator A is fully charged, it may virtually short circuit the charging current via the first transistor T1, that is, it can connect the central tap of the charging coil to the anodes of the first D1 and second diodes D2. The diode D3 may keep the accumulator A to also be short-circuited when the first transistor T1 is interconnected.

When the charging coil is furthermore inductively connected to the charger, the one half-wave of the pulsating direct current can furthermore flow through the first diode D1, the first partial winding L1, the second partial winding T2 and the light emitting diode LED when the controllable switch S is turned on. In one example, the control circuit uC will control the controllable switch S in such a manner that the light emitting diode LED blinks and thus displays the charged status of the accumulator A. The other half-wave of the pulsating direct current can then flow only through the second diode D2, the second partial winding L2 and the first transistor T1. When the charging coil is separated from the charger, a pulsating direct current does not flow any longer and the light emitting diode LED fades.

When the control circuit uC has interconnected the first transistor T1, the accumulator A is decoupled from the full-wave rectifier by the diode D3, and the accumulator A feeds the control circuit uC and the electric motor M, which can be turned on or off by the control circuit uC via the second transistor T2.

In an alternative of the afore mentioned electronic circuit, the controllable switch S is replaced by a jumper. In this case, the light emitting diode LED always glows when the charging coil is coupled to the charger. In this alternative, a user is not able to differentiate whether the accumulator A is still being charged or has already been fully charged.

Figure 2:
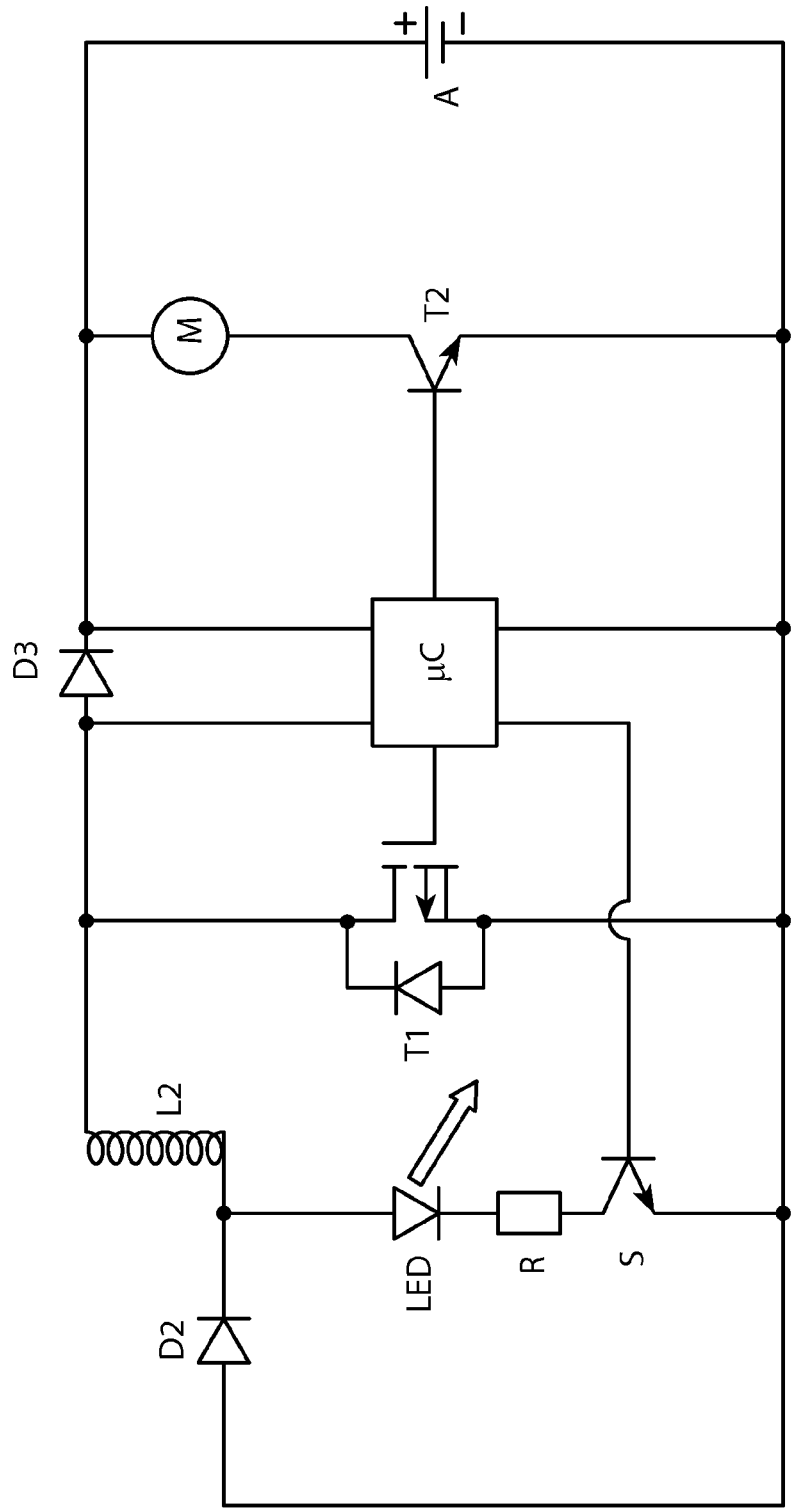
FIG. 2 shows a second electronic circuit.

In another alternative of the above-described electronic circuit, which is illustrated in FIG. 2, the first diode D1 and the first partial winding L1 are not completed and the first transistor T1 is-an n-channel MOSFET. Such a transistor inherently encompasses a protective diode. When the control circuit uC interconnects the first transistor T1 to complete the charging of the accumulator A, the light emitting diode LED can display the fully charged status of the accumulator A, wherein the current for this purpose (e.g., the one half-wave of the pulsating direct current), flows through the charging coil L2, the protective diode, the controllable switch S turned on by the control circuit uC, and the resistor R. The other half-wave of the pulsating direct current then flows through the charging coil L2, the second diode D2 and the first transistor T1.

Figure 3:
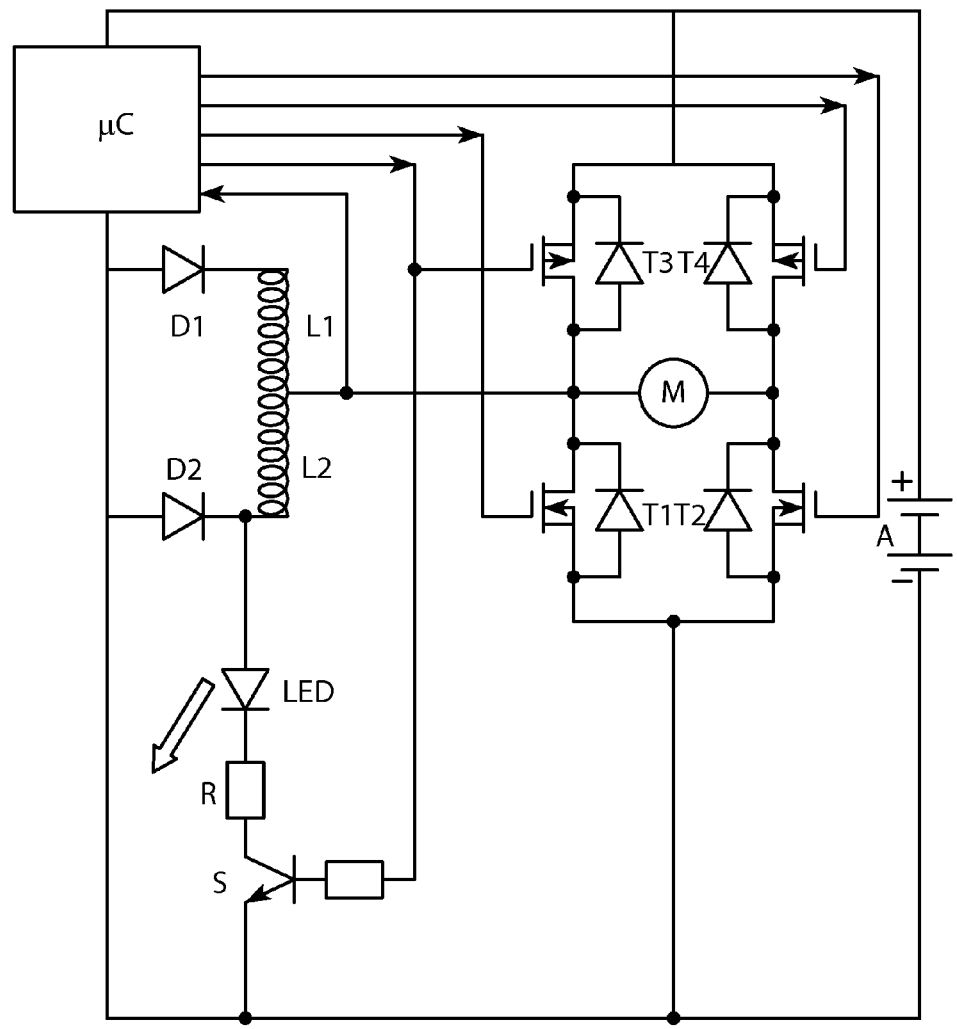
FIG. 3 shows a third electronic circuit.

As is the case with the electronic circuit illustrated in FIG. 1, the third electronic circuit illustrated in FIG. 3 includes a full-wave rectifier, which encompasses a first diode D1, a second diode D2 and a charging coil having a central tap,-a first partial winding L1 and a second partial winding L2. The cathode of the first diode D1 is connected to the first partial winding L1 and the cathode of the second diode D2 is connected to the second partial winding L2 and to the anode of a light emitting diode LED. The cathode of the light emitting diode LED is connected to the negative pole of the accumulator A and the anodes of the first D1 and second diode D2 via a resistor R and a controllable switch S, for example a transistor. The controllable switch S is controlled by a control circuit uC, to which current is fed by the accumulator A. The control circuit uC is furthermore connected to the central tap of the charging coil, so as to detect the absence/presence of a charging voltage.

The electronic circuit illustrated in FIG. 3 differs from the electronic circuit illustrated in FIG. 1 in that the central tap of the charging coil is connected to the transversal branch of a bridge circuit, which encompasses four transistors T1, T2, T3, T4 and in the transversal branches of which the electric motor M or another load is arranged. In one example, the four transistors T1, T2, T3, T4 are MOSFETs, which can be controlled by the control circuit uC and which inherently encompass a protective diode. The first transistor T1 and second transistor T2 may be n-channel MOSFETs, the source terminals of which are connected to the negative pole of the accumulator A; the third T3 and fourth transistor T4 may also be n-channel MOSFETs, the source terminals of which are connected to the positive pole of the accumulator A. The drain terminals of the first transistor T1 and third transistor T3 are connected to the central tap of the full-wave rectifier and to the one end of the motor M and the drain terminals of the second transistor T2 and fourth transistor T4 are connected to the other end of the motor M.

In comparison to the circuit illustrated in FIG. 1, the protective diode of the transistor T3 takes over the function of the further diode D3, enabling the accumulator A to be charged without the control circuit uC having to be operational when a pulsating direct current is present at the center tap of the charging coil. In the circuit illustrated in FIG. 3, the first transistor T1 also takes over the function of the first transistor T1 of the circuit illustrated in FIG. 1, that is, the termination of the charging of the accumulator A. The control circuit uC ensures that the third transistor T3 is blocked when the first transistor T1 is interconnected so that the accumulator A is not short-circuited.

In an alternative of the electronic circuit illustrated in FIG. 3, the first diode D1 and the first partial winding L1 are not employed. This part of the electronic circuit operates similarly to the circuits illustrated in FIG. 2.

The invention claimed is:

1. An electronic circuit for a battery-operated electric appliance, which can be inductively fed by an external electric power source, comprising:
 a charging circuit for charging an accumulator (A), which encompasses a charging coil (L2) and a diode (D2), wherein the accumulator (A) is connected in series to the diode (D2) and the charging coil (L2),
 a light emitting diode (LED) as display for the charging process and/or charging status of the accumulator (A), wherein an end of the charging coil (L2) is connected to the cathode of the diode (D2) and the anode of the light emitting diode (LED) and the negative pole of the accumulator (A) is connected to the anode of the diode (D2).

2. The electronic circuit of claim 1, comprising:
 a controllable switch (S), coupled to the light emitting diode; and
 a control circuit (uC) coupled to the controllable switch and configured to turn the light emitting diode (LED) on and off.

3. The electronic circuit of claim 2, comprising:
an electronic switch (T1), controllable by the control circuit (uC) and configured to complete the charging process of the accumulator (A).

4. The electronic circuit of claim 3 wherein,
the control circuit (uC) is configured to turn on the light emitting diode (LED) during the charging of the accumulator (A).

5. The electronic circuit of claim 1, comprising:
a second charging coil (L1) and a second diode (D1), which are configured to operate with the diode (D2) and the charging coil (L2) to form a full-wave rectifier.

6. An electronic circuit for a battery-operated electric appliance, comprising:
a charging coil (L2) for generating a charging current; a load (M); a bridge circuit, coupled to the load, the bridge circuit including a plurality of electronic switches (T1, T2, T3, T4), wherein a protective diode is connected in parallel to at least one electronic switch (T3), and
an accumulator (A) connected in series to the protective diode and the charging coil (L2), so that charging current supplied by the charging coil (L2) flows through the protective diode.

7. The electronic circuit of claim 6, wherein,
at least one of the plurality of electronic switches (T1, T2, T3, T4) comprises a MOSFET having a protective diode.

8. The electronic circuit of claim 3 wherein,
the control circuit (uC) turns on the light emitting diode (LED) after the completion of the charging process of the accumulator (A).

9. An electronic circuit for a battery-operated electric appliance, which can be inductively fed by an external electric power source, comprising:
a charging circuit for charging an accumulator (A), which encompasses a charging coil (L2) and a diode (D2), wherein the accumulator (A) is connected in series to the diode (D2) and the charging coil (L2),
a light emitting diode (LED) as display for the charging process and/or charging status of the accumulator (A),
wherein an end of the charging coil (L2) is connected to the cathode of the diode (D2) and the anode of the light emitting diode (LED).

10. The electronic circuit according to claim 9, comprising:
a controllable switch (S), coupled to the light emitting diode; and a control circuit (uC) coupled to the controllable switch, and configured to turn the light emitting diode (LED) on and off.

11. The electronic circuit of claim 10, comprising:
an electronic switch (T1), which can be controlled by the control circuit (uC) configured to complete the charging process of the accumulator (A).

12. The electronic circuit of claim 11 wherein,
the control circuit (uC) turns on the light emitting diode (LED) during the charging of the accumulator (A).

13. The electronic circuit of claim 9, comprising:
charging coil (L1) and a second diode (D1), which are configured to operate with the diode (D2) and the charging coil (L2) to form a full-wave rectifier.

* * * * *